Jan. 17, 1939.  G. H. GILMAN  2,143,848
DRILL MOUNTING
Filed Feb. 4, 1937   7 Sheets-Sheet 2

GEORGE H. GILMAN.
INVENTOR
BY
ATTORNEY

Jan. 17, 1939. G. H. GILMAN 2,143,848
DRILL MOUNTING
Filed Feb. 4, 1937 7 Sheets-Sheet 3
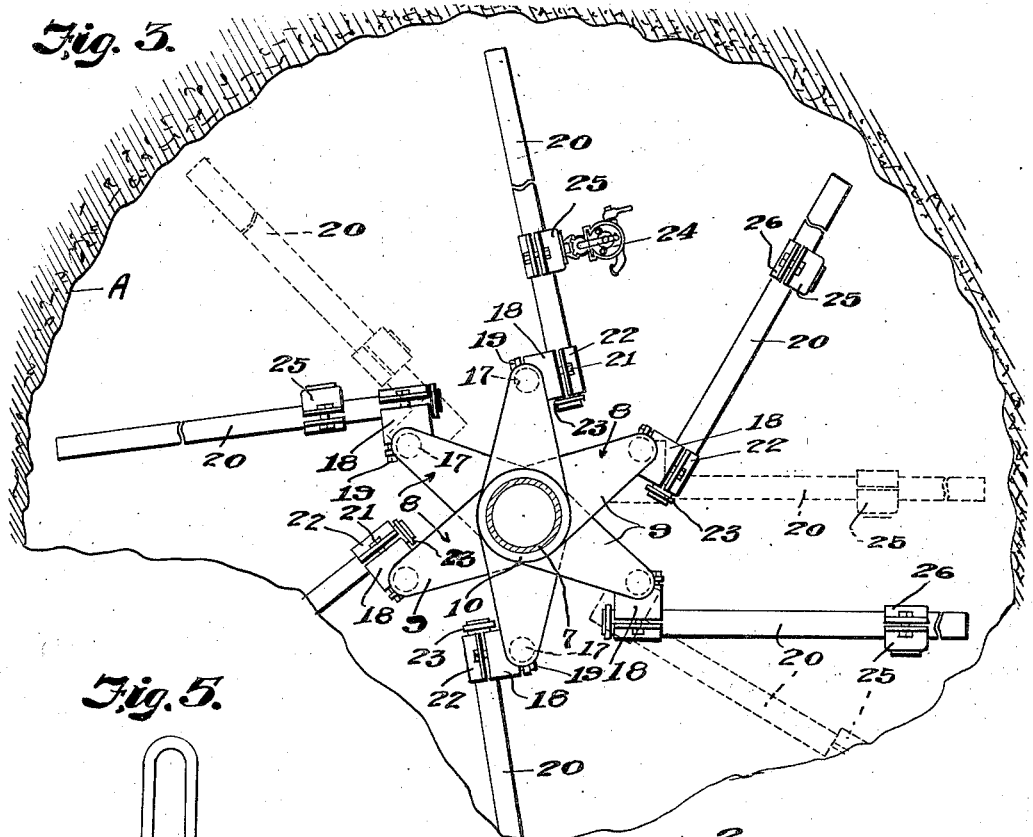
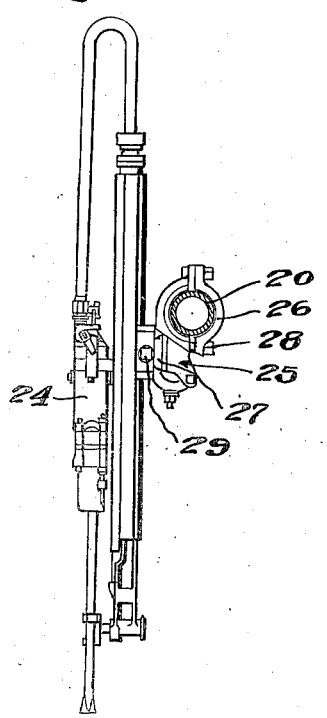
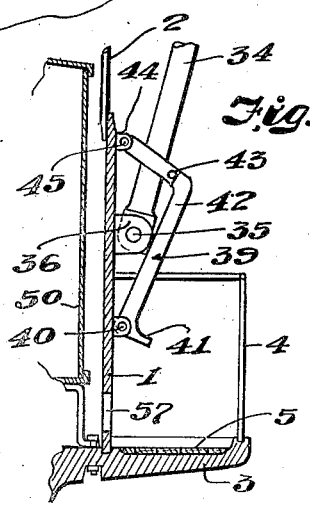
GEORGE H. GILMAN.
INVENTOR
BY
ATTORNEY

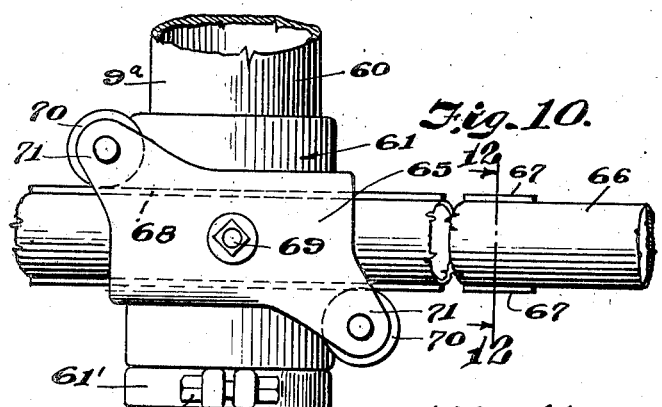
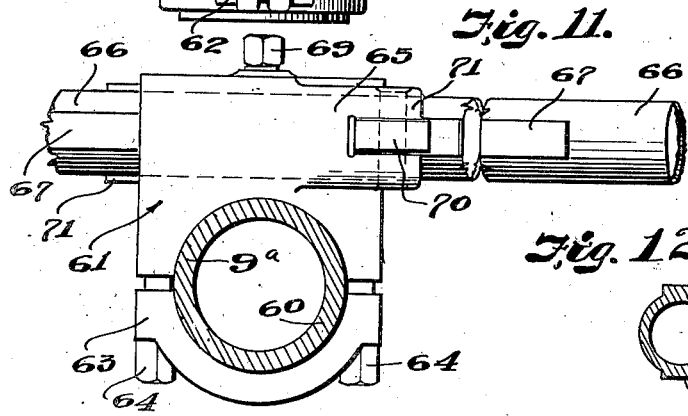
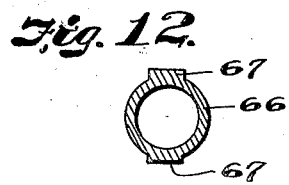
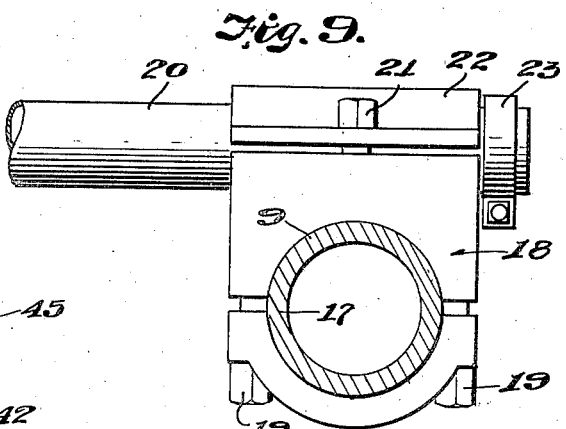
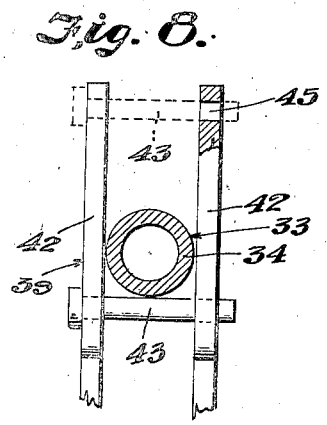

Jan. 17, 1939.  G. H. GILMAN  2,143,848
DRILL MOUNTING
Filed Feb. 4, 1937  7 Sheets-Sheet 5

GEORGE H. GILMAN.
INVENTOR
BY
ATTORNEY

GEORGE H. GILMAN.
INVENTOR

Patented Jan. 17, 1939

2,143,848

UNITED STATES PATENT OFFICE 2,143,848

DRILL MOUNTING

George H. Gilman, Washington, D. C., assignor to Worthington Pump and Machinery Corporation, Harrison, N. J., a corporation of Virginia Application February 4, 1937, Serial No. 124,094

19 Claims. (Cl. 255—51)

This invention relates to mountings for percussive tools, such as rock drills, and more particularly to a mounting for facilitating the sinking of shafts.

The sequence of operation in the sinking of shafts consists substantially of drilling, loading the drill holes, shooting and mucking or removing the material loosened by the shooting or blasting. The usual practice is to employ hand-held rock drills or use column mounting for the drills, with the result that much time and labor is required in lowering the drills into the shaft, setting them for drilling, removing them from one drill hole to another and raising them from the shaft to permit the shooting and mucking operations.

An object of the present invention is to provide a mounting embodying air and water manifolds and carrying a plurality of rock drills which are adjustably supported so that they may be quickly and easily moved from one drill hole position to another, and which mounting may be quickly and easily lowered into or withdrawn from a shaft when desired, thereby materially reducing the time and labor required in the sinking of a shaft and consequently reducing its cost.

Another object of the invention is to provide a drilling rig as specified which embodies a carrying body upon which are carried air and water manifolds, quickly and easily adjustable drill supporting arms or members which may be easily moved into a plurality of drilling positions and into collapsed position for lowering the rig into or withdrawing it from a shaft, also supporting members, including adjustable mine-column feet for holding the rig securely in place during drilling, which supporting members are so constructed and mounted that they may easily be swung into non-operative position when desired.

More particularly the present invention embodies a drilling rig as specified including a carrying body from which is suspended a supporting column having a plurality of arms rotatably mounted thereon, which arms in turn have drill supporting bars adjustably carried thereby, upon which the drills or other tools are adjustably mounted, thereby permitting a maximum variety of positions for the drills within the limits of adjustment of the arms and drills.

The invention also embodies novel means for facilitating the adjustment of the drill carrying bars and the drills thereon, which will permit adjustment of these elements by one man and without excessive effort.

With these and other objects in view, as may appear from the accompanying specification, the invention consists of various features of construction and combination of parts, which will be first described in connection with the accompanying drawings, showing a drill mounting of the preferred form embodying the invention, and the features forming the invention will be specifically pointed out in the claims.

In the drawings:

Figure 3 is a horizontal section through the drilling rig taken on the line 3—3 of Figure 1 of the drawings.

Figure 4 is a fragmentary section showing one of the supporting arms in collapsed position.

Figure 5 is a detailed section through one of the drill supporting bars showing a drill mounted thereon and taken approximately on the line 5—5 of Figure 1.

Figure 8 is a detailed cross-section taken on the line 8—8 of Figure 1 and showing another means for holding the supporting arms in non-operative position.

Figure 9 is an enlarged fragmentary view showing the coupling member employed for adjustably connecting the drill or tool carrying bars to the adjustable supporting arms.

Figure 10 is an enlarged side elevation of a modified form of the drill carrying bar and the coupling member for connecting it to the adjustable supporting arm.

Figure 11 is a top plan of the structure shown in Figure 10.

Figure 12 is a cross-section taken on the line 12—12 of Figure 10.

Figure 1:
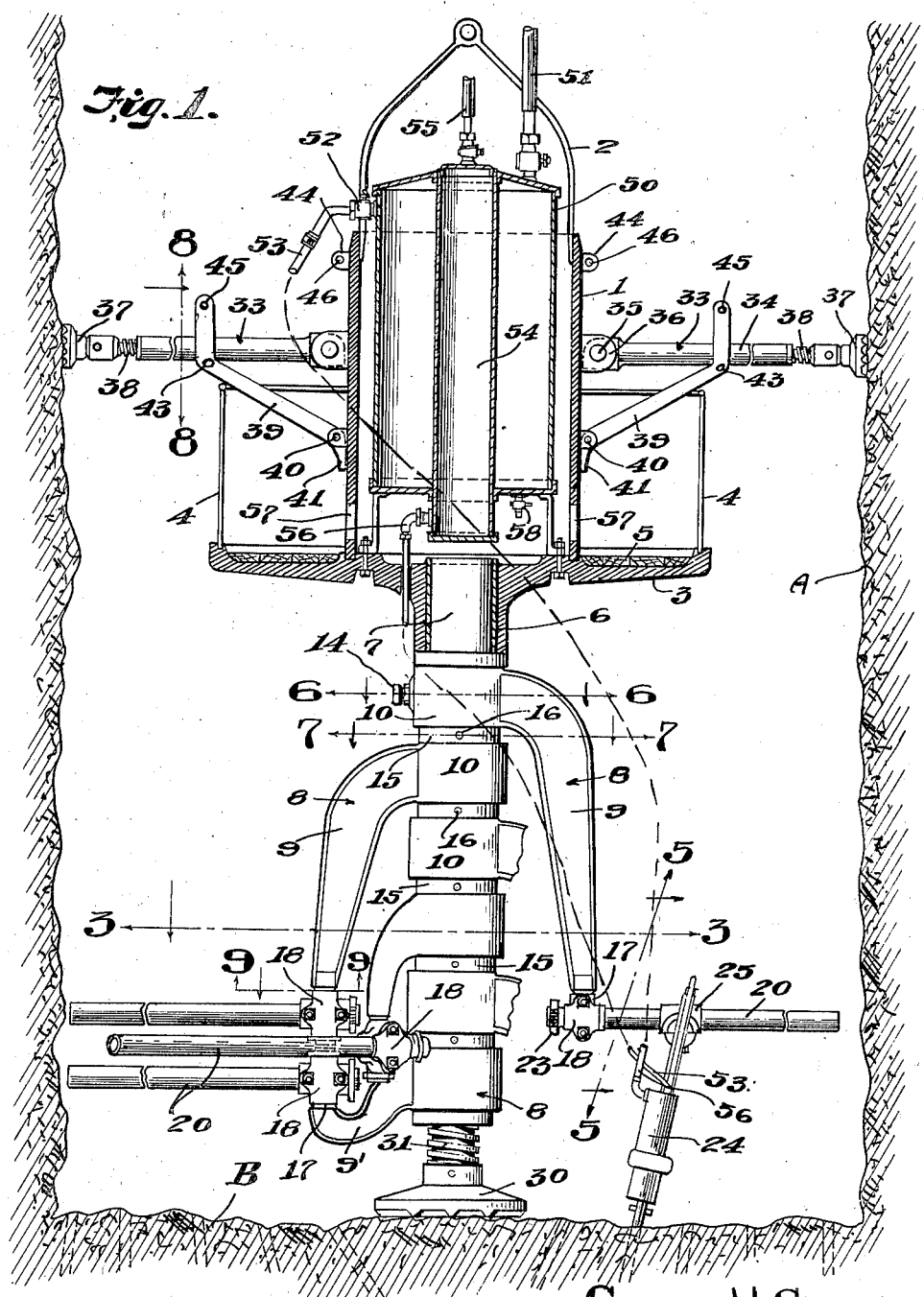
Figure 1 is a view partly in elevation and partly in section of the improved drilling rig.
Figure 2:
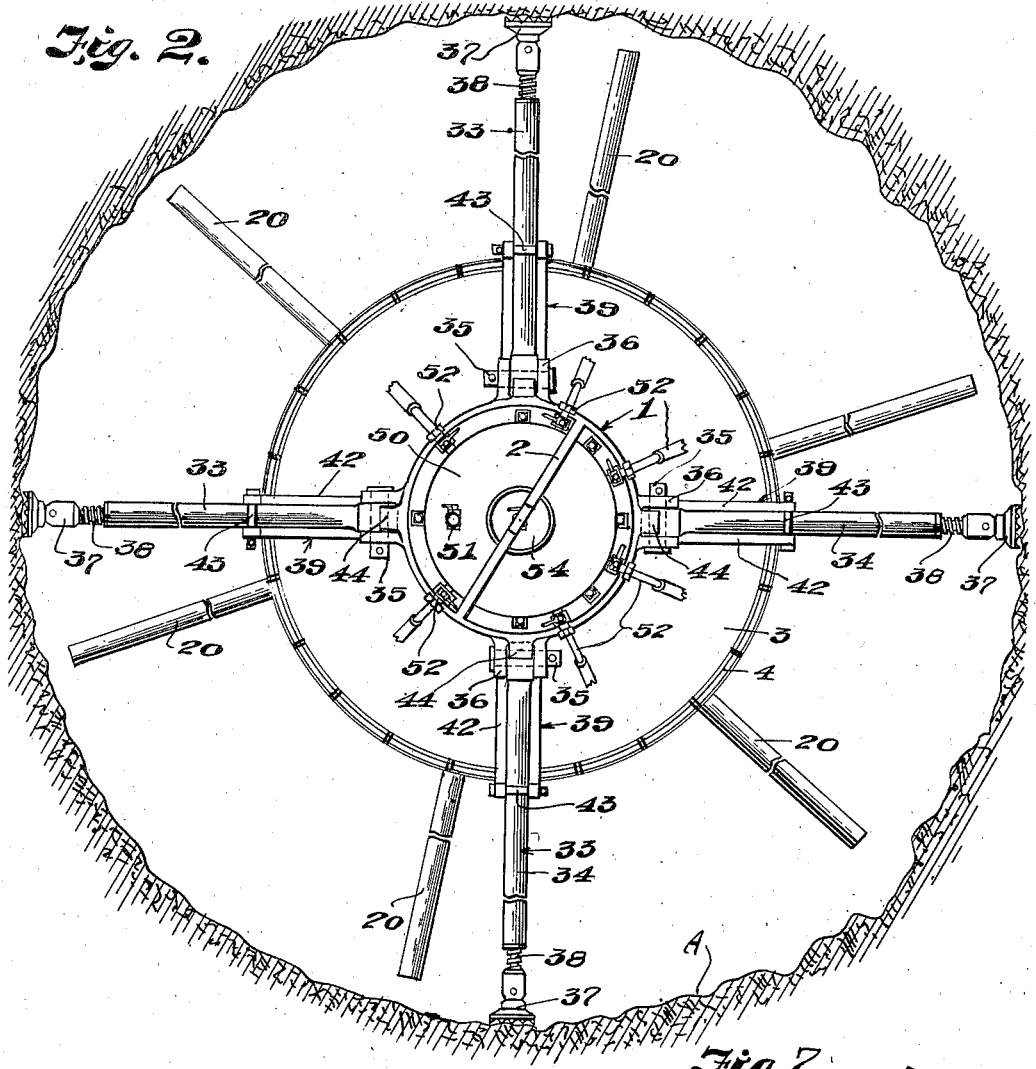
Figure 2 is a top plan of the drilling rig having the drills removed.

Referring more particularly to the drawings, the improved drill mounting comprises a carrying body 1 which is preferably cylindrical in shape, having its upper end open. A bail 2 is attached to the upper end of the carrying body 1 and is adapted to be connected with any suitable means for raising or lowering the drill mounting out of or into a shaft being sunk, as indicated at A.

The carrying body 1 has a platform 3 secured to its lower end in any suitable manner, and a rail 4 is carried by the platform 3. The platform 3 is preferably made of cast metal and it may have a floor 5 of wood or any other suitable material upon which an operator may stand.

The platform 3 has a centrally disposed sleeve 6 formed thereon which serves as a means of connecting the end of the column 7 to the carrying body 1. The column 7 depends from the carrying body 1 preferably axially thereof, and it serves as a mounting or support for a plurality of drill carrying units 8.

Each of the drill carrying units 8 includes a carrying arm 9 which extends radially from and downward along the column 7, as clearly shown in Figure 1 of the drawings, with the exception of the arms 9' of the lowermost units 8, which arms 9' extend radially and curve upwardly, as clearly shown in Figure 1 of the drawings. Collars 10 are formed on the upper ends of the arms 9 and 9' and are mounted about the column 7 to permit the arms 9 and 9' to be swung about the column 7 as an axis. Clamping shoes 11 are adjustably carried by extensions 12 formed on the collars 10, and these clamping shoes 11 are forced into clamping engagement with the column 7 by means of clamping bolts 14 to hold the collars 10 and arms 9 and 9' rigidly against swinging or rotary movement relative to the column 7.

Figures 6, 7:
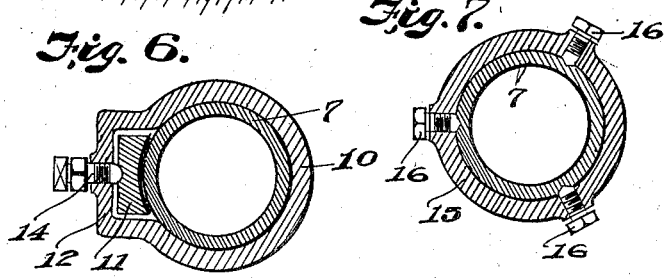
Figure 6 is a detailed cross-section taken on the line 6—6 of Figure 1.
Figure 7 is a detailed cross-section taken on the line 7—7 of Figure 1.

The collars 10 are held in proper spaced relation along the column 7 by means of spacing collars 15 which are held in place by set screws 16, as clearly shown in Figure 7 of the drawings.

The ends of the arms 9 remote from the collars 10 are shaped to form trunnions or cylindrical extensions 17, to which extensions are detachably connected coupling and supporting brackets 18. The coupling and supporting brackets 18 are mounted upon the cylindrical extensions 17 of the arms 9 to permit pivotable movement of the coupling 18 about vertical axes and they are rigidly held in adjusted positions by means of the clamping bolts 19.

Drill carrying bars 20 are slidably supported by the brackets 18 for longitudinal movement relative to the brackets transversely of the axis of the arms 9 and 9', that is, for longitudinal movement relative to the brackets in a horizontal plane. The drill carrying bars 20 are held in longitudinally adjusted positions by means of the clamping sections 22 of the brackets 18. Safety collars 23 are mounted on the inner ends of the bars 20 so as to prevent the bars from being pulled outwardly through the brackets 18.

Pneumatic tools such as rock drills or the like, are adjustably carried by the drill carrying bars 20 and in the drawings a rock drill of the pneumatic feed type is illustrated at 24. These rock drills of the pneumatic or automatic feed type are particularly adaptable for use in combination with the other features of the drill mounting of the present invention, because they feed the drill automatically to its work, thereby permitting a material reduction in the number of drillers necessary in sinking a shaft, and they also eliminate many of the disadvantages of manually fed drills such as those employing screw feeds not only in that they provide a steady, uniform and even feed for the drills, but their feed mechanism will not clog and be interfered with by the muck, etc., which is ever present in a shaft being sunk. The drills shown in the drawings are of the type shown in Patent Numbers 1,659,139 and 1,680,859 but it is to be understood that any type of automatic feed drill or tool may be employed in combination with the drill mounting without departing from the spirit of the present invention, and also if conditions warrant or require it, any suitable type of drill or tool may be employed without departing from the spirit of the present invention.

The drill or tool 24 is mounted upon the bar 20 through the medium of a suitable mounting clamp structure 25. This mounting clamp structure 25 is such that it permits longitudinally adjusted movement of a drill along the bar 20 by means of the clamping portion 26 thereupon, and it permits pivotal movement of the drill on an axis transversely of the axis of the bar 20 through the medium of the trunnion structure 27 of the clamp. These clamps are of a type which has long been in use in connection with the pneumatic feed percussive tools and forms no part of the present invention except in the general combination which permits of the great flexibility of adjustment of the drills. The drill 24 and the clamp structure 25 are held in adjusted position along the bar 20 by means of the clamping bolts 28 and the drill is held in various pivoted positions by means of the locking structure indicated at 29.

By means of the arms 9 which are swingably mounted with respect to the carrying body 1 through the medium of the collars 10, the adjustability of the bars 20, and the longitudinal and pivotal adjustment of the drills 24 relative to the bars 20, it will be apparent that relatively great limits of adjustability of the positions, angles, etc., of the drills are provided. By providing the plurality of drill carrying units 8, a number of drills may be carried by the drill mounting and set accurately to drill holes in the rock through which the shaft A is being sunk. After one set of holes which are indicated at B in Figure 1 of the drawings has been drilled, the various drills 24 may be quickly, easily, and accurately set to drill the next series of holes, and an entire series of holes may be simultaneously drilled. In sinking shafts it has been proven that the best results in blasting are obtained by a particular arrangement and angling of the drill holes and with the present drill mounting such angling of the drill holes may be quite accurately controlled.

Figure 17:
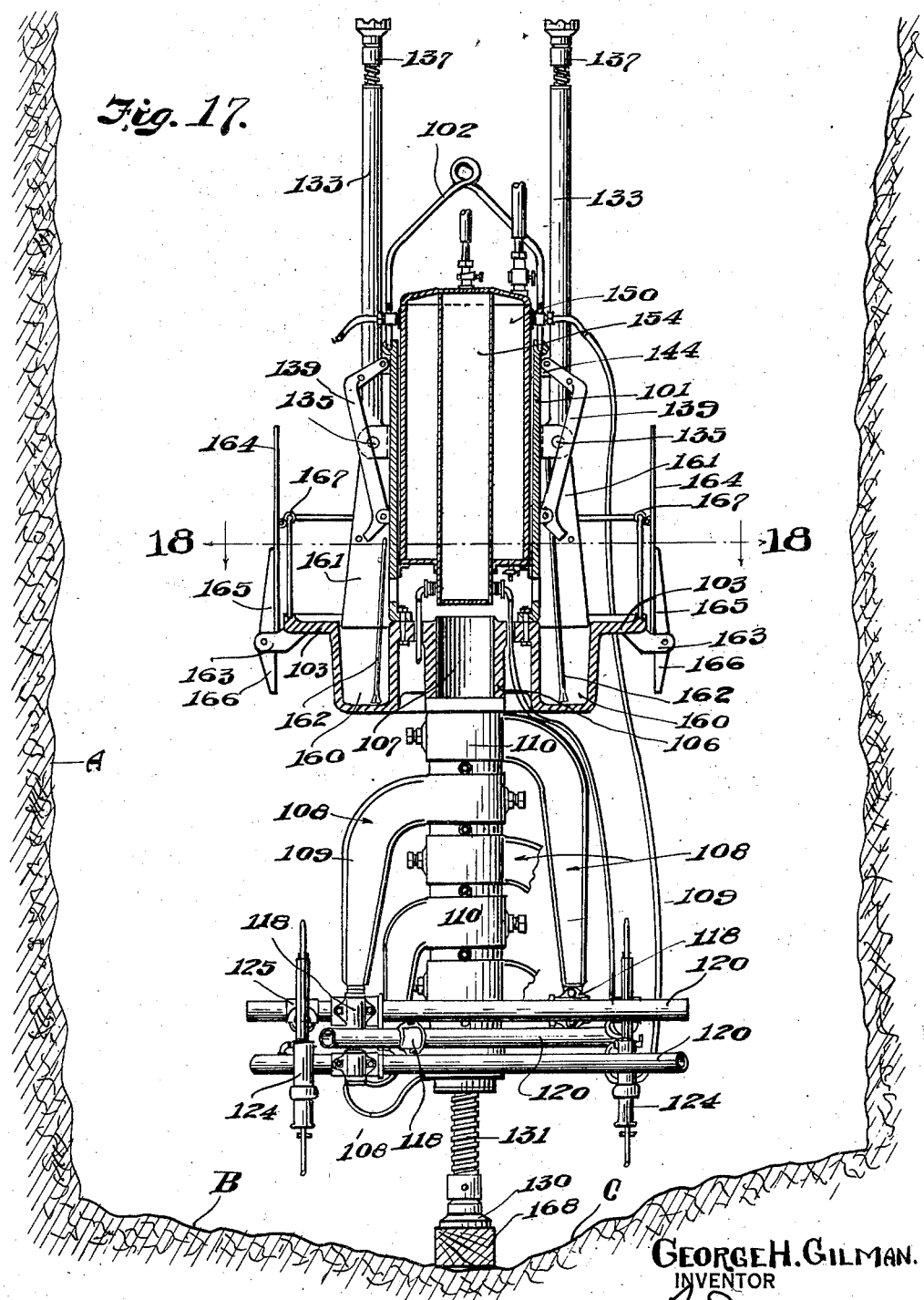
Figure 17 is a view in side elevation and partly in section of a slightly modified form of the drill mounting or drilling rig showing the same in collapsed position.

In shaft sinking the working floor of the shaft is uneven, and usually a sump as shown at C in Figure 17 of the drawings is left therein to collect the water in the shaft to facilitate its pumping therefrom, and for the purpose of providing a support for the bottom of the column 7 and the drill mounting, and at the same time permit accurate positioning of the drill carrying bars 20 at the proper level with respect to the working surface or floor of the shaft A, a foot 30 is adjustably connected by means of a feed screw 31 to the lower end of the column 7.

The weight of the drill mounting or drilling rig is depended upon to maintain it in position during drilling, however for the purpose of steadying and properly positioning the mounting or rig in proper position in a shaft A, a plurality of anchoring members 33 are provided which are carrier by the carrying body 1. Each of the anchoring members 33 comprise a column or arm 34 which is pivotally connected by means of suitable pivot pins 35 and brackets 36 to the carrying body 1, intermediately of its ends. The arms 34 extend radially from the carrying body 1 and have mine-column feet 37, adjustably connected thereto by means of feed screws 38 at their outer ends. After the drill mounting has been lowered into a shaft A the various feet 37 are adjusted to securely engage the relatively irregular surfaces of the side-walls of the shaft to securely hold the drill mounting in position within the shaft.

It is desirable when withdrawing the drill mounting from a shaft to collapse it as much as possible so as to require as little space as possible by the mounting when it is withdrawn and also to permit it to be moved freely upward out of the shaft, and it is for this reason that the arms 34 are pivotally connected to the carrying body 1. Suitable pivotable supports 39 are provided for each of the arms 34. The supports 39 are pivotally connected as shown at 40 to the carrying body 1 and they have depending feet 41 formed thereon which engage the outer sides of the carrying body 1, as clearly shown in Figure 1 of the drawings, to provide firm abutment surfaces between the pivotal arms 39 and the carrying body 1.

Each of the pivotal supporting arms 39 comprise spaced members 42, one of which engages on each side of the arm 34. Pins 43 are removably carried by the members 42 and when the anchoring arms 33 are in their lowered position and during their movement into lowered position the pins 43 are inserted through suitable openings in the members 42 beneath the arms 34. The ends of the members 42 are adapted to engage over locking lugs 44, carried by the carrying body 1, when the arms 34 are swung into an upward collapsed position, as shown in Figures 4 and 17 of the drawings, suitable locking pins are inserted through the upper openings 45 in the members 42 and into suitable openings 46 in the locking lugs 44, so as to prevent accidental falling movement of the anchoring arms during the withdrawal of the drill mounting from a shaft.

The carrying body 1 also carries an air tank or manifold 50, which is connected by means of a hose or other suitable connection 51 to any suitable supply source (not shown) of air under pressure. The manifold 50 has individual connections 52 thereon for supplying air under pressure through suitable flexible hose 53 to each of the drills or tools carried by the drill carrying bars 20.

A water manifold is also carried by the carrying body 1 and this water manifold preferably extends axially through the air manifold, as shown in Figure 1 of the drawings, however if desired, it may be placed at any suitable position relative to the air manifold without departing from the spirit of the present invention. The water manifold 54 has connection through a line 55 with a suitable supply source (not shown) of cleansing water and it has individual connections, as shown at 56, with the various drills 24 for supplying hole-cleansing fluid to the drills.

The air under pressure which is employed for operating the drills 24 contains a percentage of moisture, and as the air is cooled this moisture condenses out of the air. The air will be cooled by the temperature within the shaft, particularly when the shaft becomes deep, and also by positioning the water manifold 54 within the air manifold 50, it will act as an after-cooler and will further cool the air in the manifold 50 and condense the moisture from the air. The condensate or extracted water will collect in the bottom of the manifold 50 from which it may be drawn off through a drain cock 58. The air off-take connections 52 are at the top of the manifold 50 so that clean relatively dry air will be delivered to the drills of tools 24.

The cylindrical carrying body 1 is provided with openings 57 to permit access to the couplings 56 and to the drain cock 58 for the air manifold 50.

In Figures 10 to 12 of the drawings a modified form of the structure for connecting the drill-carrying bars or arms to the swingable arms of the drill carrying units is shown. In this construction the substantially cylindrical ends 60 of the swingable arms 9a have brackets 61 mounted thereon. The brackets 61 are prevented from moving off the ends of the arms 9a by fixed clamps 61', which comprise clamping rings and clamping bolts 62.

The brackets 61 are bored to receive the ends 60 of the arms 9a and they are securely held in adjusted position on the extension 60 by the clamping heads 63 and clamping bolts 64, as clearly shown in Figure 11 of the drawings.

The brackets 61 have laterally positioned bar receiving barrels 65 formed thereon, which are bored to receive the bars 66. The bores of the barrels 65 extend at right angles to the axis of the extensions 60. The drill carrying bars 66 have keys 67 formed thereon which engage in key-ways 68 formed in the barrels 65 so as to prevent rotary movement of the slidable drill carrying arms or bars 66. The bars or arms 66 slide through the barrels 65 for permitting adjustment of the position of the drills (not shown) carried thereby, and also to permit collapsing or inward movement of the bars toward the axis of the drill mounting when it is desired to withdraw it from a shaft or lower it into one. Clamping screws 69 are carried by the barrels 65 for locking the arms or bars 66 in adjusted positions relative to the brackets 61.

To facilitate the sliding movement of the bars or arms 66, relative to the bracket 61, rollers 70 are provided which are rotatably carried by suitable brackets 71, preferably formed on the barrels 65. The rollers 70 engage the flat outer surface of the keys 67 so as to relieve friction and facilitate the sliding movement of the bars 66. While in the drawings only two rollers 70 are shown, it is to be understood that any number of rollers may be provided without departing from the spirit of the present invention. The provision of the rollers 70 will permit the bars or arms 66 with drills thereon to be adjusted by one man.

Figure 13:
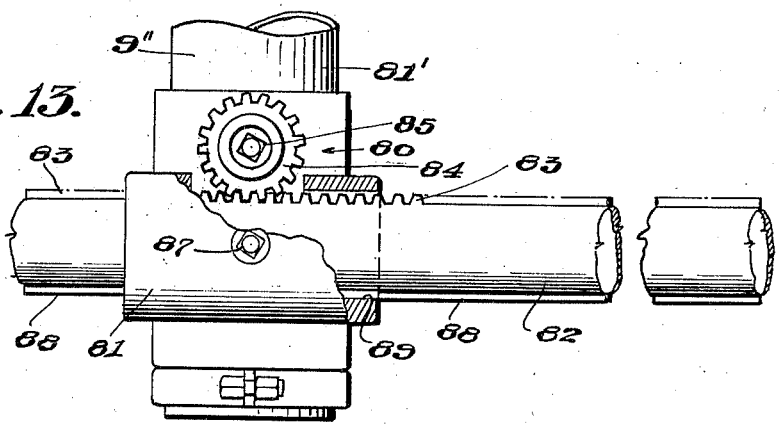
Figure 13 is an enlarged view showing still further modified form of the drill carrying bar and the manner of connecting it to the adjustable arm and having parts of this structure broken away.
Figure 14:
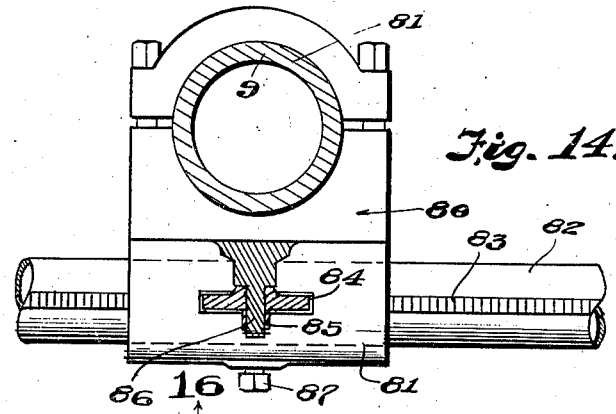
Figure 14 is a top plan view partly in section, of the modified form shown in Figure 13.

Figures 13 and 14 show a further modification of the manner of connecting the drill supporting or carrying bars or arms to the swinging arms and in this modified form the brackets 80 are mounted upon the extensions 81' of the swinging arms 9'' in the same manner in which the brackets 18 and 61 are mounted upon the similar extensions. The bracket 80 has a barrel 81 formed thereon at one side of the bracket, the bore of which extends at right angles to the axis of the extension 81'. The barrel 81 slidably receives therethrough the drill carrying arm or bar 82. The arm or bar 82 has a rack 83 formed thereon and extending longitudinally thereof. The teeth of the rack 83 are engaged by a pinion 84 so that by rotation of the pinion the bar or arm 82 may be moved longitudinally through the barrel 81. The pinion 84 preferably has a wrench head 85 formed thereon for receiving a wrench or crank handle, by means of which the pinion may be rotated. The pinion is rotatably supported on a shaft 86, formed upon or suitably attached to the bracket 80. A locking screw 87 is provided for locking the bar or arm 82 in adjusted positions. If it is so desired, the bars 82 may have a key 88 thereon, diametrically opposite the rack 83, which key, engaging in a keyway 89 in the barrel 81, will cooperate with the rack 83 to prevent rotation of the bar or arm 82 relative to the bracket 80.

Figure 15:
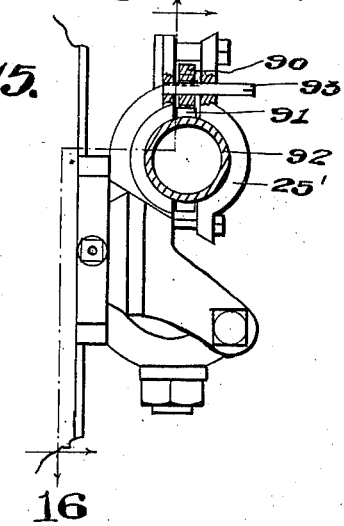
Figure 15 is a view partly in section showing modified structure for adjustably mounting a drill or other tool upon the drill carrying bar.
Figure 16:
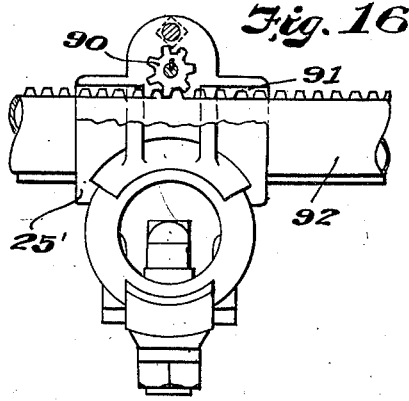
Figure 16 is a cross-section on the line 16—16 of Figure 15.

If it is so desired, means may be provided for facilitating the movement of the drills along the supporting arms or bars and in Figures 15 and 16 of the drawings, a structure is shown which discloses such means.

In this modification shown in Figures 15 and 16, the bracket or mounting 25' has a pinion 90 rotatably carried thereby, which engages the teeth of a rack 91 formed on the arm or bar 92. Of course, this rack 91 may be the same rack as the rack 83, shown in Figures 13 and 14, which cooperates with a pinion 84 for moving the bar. The pinion 90 has a wrench head 93 thereon by means of which the pinion may be rotated for moving the drill (not shown) carried by the bracket 25' along the bar 92.

When these rack and pinion structures, as shown in Figures 13 to 16 inclusive are employed, the wrench heads 85 and 93 will be of the same sizes as the heads of the locking bolts 87, 29, etc., so that a single wrench or crank handle may be used for all of the wrench heads and screw heads.

Figure 18:
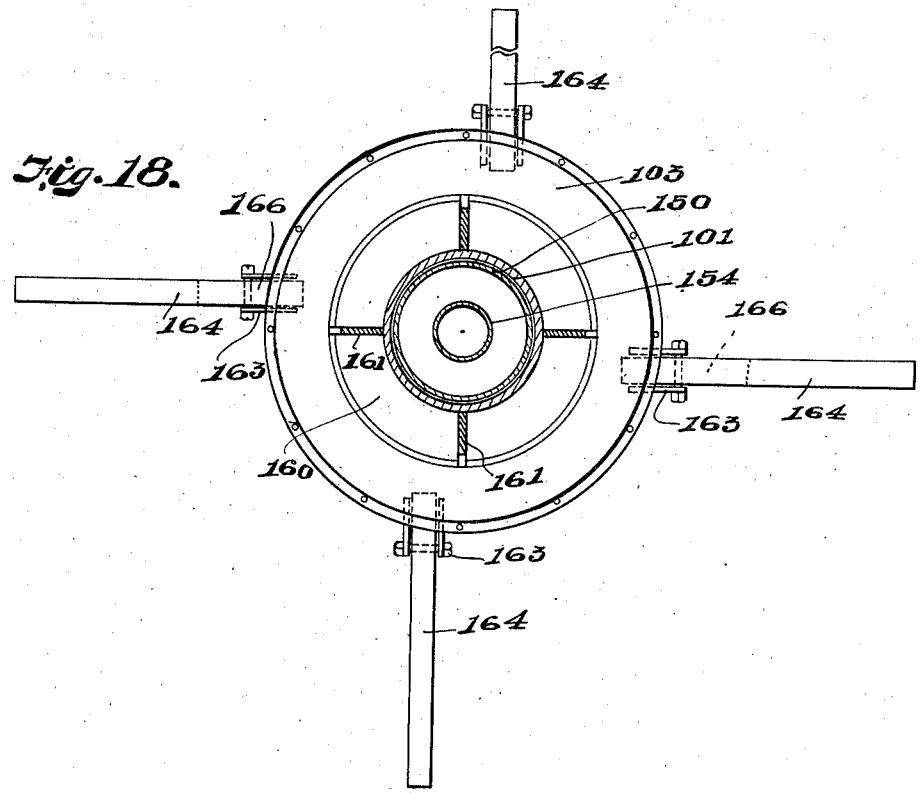
Figure 18 is a detail view of a part of the drilling rig shown in Figure 17 with the platforms lowered.
Figure 19:
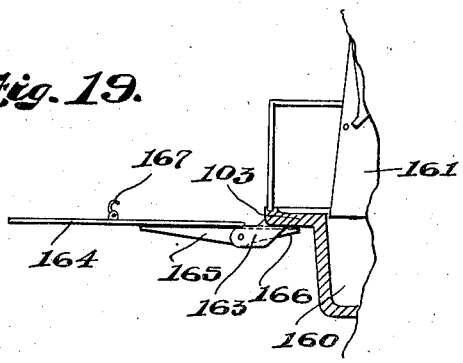
Figure 19 is a top plan of the structure shown in Figure 18.

In Figures 17 to 19 inclusive, a modified form of the improved drill mounting or drilling rig is shown, and in Figure 17 various parts are shown in collapsed position with the drill mounting set for lowering into a shaft or withdrawing it therefrom.

In this modified structure, the carrying body 101 is similar to the carrying body 1 and has a bail 102 connected thereto by means of which the drill mounting may be raised from or lowered into a shaft.

The carrying body 101 has a column 107 depending axially therefrom which is connected to the platform 103 by means of the sleeve 106. The column 107 has a plurality of drill or tool carrying units 108 carried thereby which are similar or identical in construction to the drill or tool carrying units 8. Each of the units 108 comprises a carrying arm 109 which is swivelly connected by means of the ring 110 to the column 107. Brackets 118 are carried by the lower ends of the swinging arms 109 and they are substantially identical with the brackets 18. Drill carrying bars 120 are slidably carried by the brackets 118 and are held in adjusted positions in the same manner in which the bars 20 are held in adjusted positions. Rock drills or other suitable tools as indicated at 124 are connected to or mounted upon the bars 120 so that they may be adjusted longitudinally along the bars 120 or pivotally thereto, being connected to the bars by means of brackets 125 which are identical in construction to the brackets 25.

The carrying body 101 has anchoring or steadying arms 133 pivotally connected thereto as shown at 135 and these arms are identical in construction with the arms 33 and are held in their collapsed or inward movement by means of the guiding arms 139 and the locking members 144. An air manifold 150 and a water manifold 154 are carried by the carrying body 101.

In all of the above respects the modified structure shown in Figure 17 is identical with the structure shown in Figure 1, and the structure shown in Figure 1 is collapsed in exactly the same manner shown in Figure 17 for permitting its lowering into or withdrawal from a shaft.

However, the modified structure shown in Figure 17 differs from the structure shown in Figure 1 in that the platform 103 has an annular well 160 formed therein and partitioning braces 161 are attached to the carrying body 101 and form supporting braces against which drill steels indicated at 162 may rest. The wells 160 are provided for receiving drill steels to be used in the drills 124 and the partitions 161 provided separate compartments for containing drill steels of different lengths so as to keep the different length drill steels segregated, and also they may provide compartments for the dulled drill steels.

As clearly shown in Figure 17 of the drawings, the platform 103 surrounds the annular well 160, so that a man standing on the platform will have ready access to any of the drill steels in any of the compartments, and he can hand a drill of the desired length to the drill operator and receive from the operator the dulled steel, thereby eliminating much time which would otherwise be required in the changing of the steels, and also eliminating the need of piling the steels on the working surface or floor B of the shaft being sunk.

The platform 103 has a plurality of brackets 163 attached thereto to which are pivotally connected narrow platforms 164. Suitable supporting hinging members 165 are provided for pivotally connecting the platforms 164 to the brackets 163. The hinging members 165 have extensions 166 thereon which, when the platforms 164 are in extended position as shown in Figure 18, engage beneath the platform 103 and provide supports for the narrow platforms or "cat walks" 164. The narrow platforms 164 may be lowered into horizontal position so as to permit an operator to walk out along them for adjusting the mine-feet 137 which are adjustably carried by the anchoring or steadying arms 133. When the narrow platforms 164 are not in use they are swung into substantially feed positions, as shown in Figure 17 and they may be held therein by any suitable type of locking means as indicated at 167.

Another slight difference is shown in Figure 17 from the structure shown in Figure 1 with respect to the mine-foot which is adjustably connected to the end of the column 107. In Figure 17 the foot 130, which is adjustably connected by means of the feed screw 131 to the column 137, is shown resting upon a wooden block 168. This block 168 may be attached to the foot or it may be independent thereof. The foot 130 is shown placed in the sump C in the working floor B of the shaft, and by provision of the feed screw 131, the drill mounting may have supporting contact with the working surface B of the shaft and the drill carrying bars 120 be maintained at the proper elevation with respect to the working surface. This is a distinct advantage owing to the fact that the working surfaces B are usually very irregular.

From the foregoing description taken in connection with the accompanying drawings, it will be apparent that a drill mounting or drill rig has been provided for sinking shafts by means of which the time and labor required for the sinking of a shaft will be very materially reduced and also a drill mounting has been provided which may be easily and quickly lowered into a shaft or withdrawn therefrom, and in which the parts which are extended while in operation, such as the arms 34 and the drill carrying bars or arms 20 may be collapsed or moved inwardly to permit the mounting to be freely and easily withdrawn from or lowered into a shaft.

It will be understood that the invention is not to be limited to the specific construction or arrangement of parts shown but that they may be widely modified within the invention defined by the claims.

What is claimed is:

1. In a drill mounting, a carrying body, a column carried by said body, a plurality of arms swingably carried by said column, drill supporting bars adjustably carried by said swingable arms, pneumatic tools, adjustable means connecting said tools to said bars for adjusting the position of the tools relative to the bars, a plurality of anchoring arms pivotally carried by said body, and mine column feet adjustably connected to the ends of said anchoring arms.

2. In a drill mounting, a carrying body, a column carried by said body, a plurality of arms swingably carried by said column, drill supporting bars adjustably carried by said swingable arms, pneumatic tools, adjustable means connecting said tools to said bars for adjusting the position of the tools relative to the bars, a plurality of anchoring ams pivotally carried by said body, an air manifold carried by said carrying body, a water manifold carried by said carrying body, individual connections between said manifolds and said tools, mine column feet adjustably connected to the ends of said anchoring bars, and a mine column foot adjustably connected to the end of said column remote from said carrying body.

3. In a drilling rig, a carrying body, a column carried by and depending from said carrying body, swinging arms carried by the column and mounted in superposed relation thereon, a plurality of brackets carried by said swinging arms, and tool supporting bars adjustably carried by said brackets and extending radially of said column, and means for preventing rotation of said bars relative to said brackets, said bars slidable through said brackets to permit the bars to be moved into parallel collapsed position, with their inner ends moved across the vertical axis of the drilling rig.

4. In a drilling rig, a carrying body, a column carried by and depending from said carrying body, swinging arms carried by the column and mounted in superposed relation thereon, a plurality of brackets carried by said swinging arms, and tool supporting bars adjustably carried by said brackets and extending radially of said column, racks on said bars, and pinions carried by said brackets and engaging said racks for moving said bars longitudinally of the brackets, said bars slidable through said brackets to permit the bars to be moved into parallel collapsed position, with their inner ends moved across the vertical axis of the drilling rig.

5. In a drilling rig, a carrying body, a column carried by and depending from said carrying body, swinging arms carried by and extending radially of the column and mounted in superposed relation thereon, a plurality of brackets carried by said swinging arms, and tool supporting bars adjustably carried by said brackets and extending radially of said column, drill carrying brackets mounted on said bars and constructed and arranged to permit longitudinal and pivotal movement of the drills relative to the bars, racks on said bars, and pinions carried by said tool carrying brackets for engagement with said racks to move the tool carrying brackets along the bars, said bars slidable through said brackets to permit the bars to be moved into parallel collapsed position with their inner ends moved across the vertical axis of the drilling rig.

6. In a drilling rig, a carrying body, a bail thereon, drill carrying means adjustably supported from said carrying body, anchoring arms pivotally connected to said carrying body and extending radially therefrom, means carried by the carrying body for guiding and limiting pivotal movement of said anchoring arms, locking means for holding said anchoring arms in folded positions, and mine column feet adjustably connected to the ends of said pivoted bars.

7. In a drilling rig, a carrying body, anchoring arms pivotally connected to said carrying body, means carried by the carrying body for guiding and limiting pivotal movement of said anchoring arms, swinging arms carried by said carrying body, drill-supporting bars slidably carried by the ends of said swinging arms and having their inner ends outwardly of the axis of the carrying body when the drilling rig is in drilling position, said drill-carrying arms adapted to be moved with their inner ends across the vertical axis of the carrying body when the drilling rig is in collapsed position.

8. In a drilling rig, a carrying body including a horizontal platform, a manifold supporting structure rising above said platform, anchoring arms pivotally carried by said manifold supporting structure, a column carried by and depending axially from said platform, and a plurality of rock drill supporting bars swingably and slidably carried by said column.

9. In a drilling rig, a carrying body including a horizontal platform, a manifold supporting structure rising above said platform, anchoring arms pivotally carried by said manifold supporting structure, a column carried by and depending axially from said platform, and a plurality of rock drill supporting bars swingably and slidably carried by said column, means for guiding and limiting the pivotal movement of said anchoring arms, and locking means for holding the anchoring arms in folded positions.

10. In a drilling rig, a carrying body, adjustable means for anchoring said carrying body in a shaft, a column depending from said carrying body, a plurality of swinging arms mounted on said column for independent swinging movement about the column, said swinging arms also mounted for independent vertical adjustment on said column, spacing collars for holding said swinging arms in vertically adjusted positions, and drill-carrying bars adjustably carried by said swinging arms.

11. In a drilling rig, a carrying body, adjustable means for anchoring said carrying body in a shaft, a column depending from said carrying body, a plurality of swinging arms mounted on said column for independent swinging movement about the column, said swinging arms also mounted for independent vertical adjustment on said column, spacing collars for holding said swinging arms in vertically adjusted positions, drill-carrying bars slidably and rotatably carried by the ends of said swinging arms and having their inner ends outwardly of the axis of the column when the drilling rig is in drilling position, said bars movable to position their inner ends across the vertical axis of the column to collapse the drilling rig for insertion into or removal from a shaft.

12. In a drill mounting, a carrying body, a raising and lowering connection on said body, attaching arms adjustably carried by said body, rock drill supporting bars adjustably carried by said attaching arms, a plurality of rock drills, adjustable means connecting said rock drills to said supporting bars for adjustment along the supporting bars and pivotal movement relative thereto, anchoring arms pivotally carried by said carrying body, means for locking said anchoring arms in adjusted positions, and foot pieces adjustably carried at the ends of said anchoring arms.

13. In a drilling rig, a carrying body, adjustable means for anchoring said carrying body in a shaft, a plurality of swinging arms carried by said carrying body for independent swinging movement, said swinging arms also mounted for independent vertical adjustment relative to said carrying body, spacing collars for holding said swinging arms in vertically adjusted positions, drill carrying bars slidably and rotatably carried by the ends of said swinging arms and having their inner ends outwardly of the axis of the carrying body when the drilling rig is in drilling position, said bars movable to position their inner ends across the vertical axis of the carrying body to collapse the drilling rig for insertion into or removal from a shaft.

14. In a drilling rig, a carrying body, a manifold support structure, anchoring arms pivotally carried by said manifold supporting structure, a column carried by and depending axially from said carrying body, a plurality of rock drill supporting bars swingably and slidably carried by said column, and locking means carried by said supporting structure for locking said anchoring arms in adjusted positions.

15. In a drilling rig for sinking shafts, a carrying body, a plurality of swinging arms carried by said body for swinging about the vertical axis of the carrying body, pneumatic-tool carrying bars adjustably carried by said swinging arms for adjustment transversally of the axis of the carrying body, an air manifold carried by said carrying body and concentric of its vertical axis, and a water manifold extending longitudinally through said air manifold to cool the air therein.

16. In a drilling rig for sinking shafts, a carrying body including a horizontal platform, a plurality of swinging arms carried by said body for swinging about the vertical axis of the carrying body, pneumatic-tool carrying bars adjustably carried by said swinging arms for adjustment transversally of the axis of the carrying body, a manifold supporting structure carried by said platform, an air manifold carried by said supporting structure and concentric of the vertical axis of the carrying body, and a water manifold extending longitudinally through said air manifold to cool the air therein.

17. In a drilling rig for sinking shafts, a carrying body including a horizontal platform, a plurality of swinging arms carried by said body for swinging about the vertical axis of the carrying body, pneumatic-tool carrying bars adjustably carried by said swinging arms for adjustment transversally of the axis of the carrying body, a manifold supporting structure carried by said platform, an air manifold carried by said supporting structure and concentric of the vertical axis of the carrying body, and a water manifold extending longitudinally through said air manifold to cool the air therein, anchoring arms pivotally carried by said manifold supporting structure, and locking means carried by said supporting structure for locking said anchoring arms in adjusted positions.

18. In a drilling rig, a column, a plurality of swinging arms mounted on said column for independent swinging movement about the column, brackets carried by said arms for swinging movement relative to the arms, and pneumatic tool supporting arms slidably carried by said brackets for adjustment transversally of the swinging axis of said arms, pivotally mounted anchoring arms for anchoring said column in position in a shaft, and locking means for locking said anchoring arms in adjusted positions.

19. In a drilling rig, a carrying body, adjustable means for anchoring said carrying body in a shaft, a plurality of swinging arms carried by said carrying body for independent swinging movement, said swinging arms also mounted for independent vertical adjustment relative to said carrying body, drill carrying bars slidably and rotatably carried by the ends of said swinging arms and having their inner ends outwardly of the axis of the carrying body when the drilling rig is in drilling position, said bars movable to position their inner ends across the vertical axis of the carrying body to collapse the drilling rig for insertion into or removal from a shaft.

GEORGE H. GILMAN.